United States Patent
Sunagawa et al.

[11] Patent Number: 5,995,129
[45] Date of Patent: *Nov. 30, 1999

[54] IMAGE-WISE EXPOSURE APPARATUS

[75] Inventors: Hiroshi Sunagawa; Kazuo Horikawa, both of Kanagawa-ken, Japan

[73] Assignee: Fuji Photo Film Co., Ltd., Kanagawa-ken, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/811,729

[22] Filed: Mar. 6, 1997

[30] Foreign Application Priority Data

Mar. 6, 1996 [JP] Japan .................................. 8-048781

[51] Int. Cl.$^6$ .................................................. G03B 27/32
[52] U.S. Cl. ............................... 347/239; 347/241; 349/2
[58] Field of Search .................................... 347/239, 255, 347/241, 256; 348/2, 205, 230; 329/2

[56] References Cited

U.S. PATENT DOCUMENTS

| | | | |
|---|---|---|---|
| 4,652,928 | 3/1987 | Endo et al. | 348/219 |
| 5,109,290 | 4/1992 | Imai | 349/2 |
| 5,335,009 | 8/1994 | Sun et al. | 348/614 |

FOREIGN PATENT DOCUMENTS 4-7542 1/1992 Japan .............................. G03B 27/52

Primary Examiner—N. Le
Assistant Examiner—Hai C. Pham
Attorney, Agent, or Firm—Sughrue, Mion, Zinn, Macpeak & Seas, PLLC

[57] ABSTRACT

An image-wise exposure apparatus comprises a light source for producing recording light, to which a photosensitive material is to be exposed, and a spatial modulation device provided with a plurality of picture elements located in the form of a two-dimensional array. The spatial modulation device raster-scans the picture elements and thereby carries out spatial modulation of the recording light. A picture element shifting device changes the optical relationship between the spatial modulation device and the photosensitive material. A controller sets all of the picture elements of the spatial modulation device to a totally closed condition for a single frame period and drives the picture element shifting device while all of the picture elements of the spatial modulation device are being in the totally closed condition. Effects of a picture element shifting operation are thereby obtained sufficiently, and image-wise exposure is carried out quickly.

9 Claims, 3 Drawing Sheets

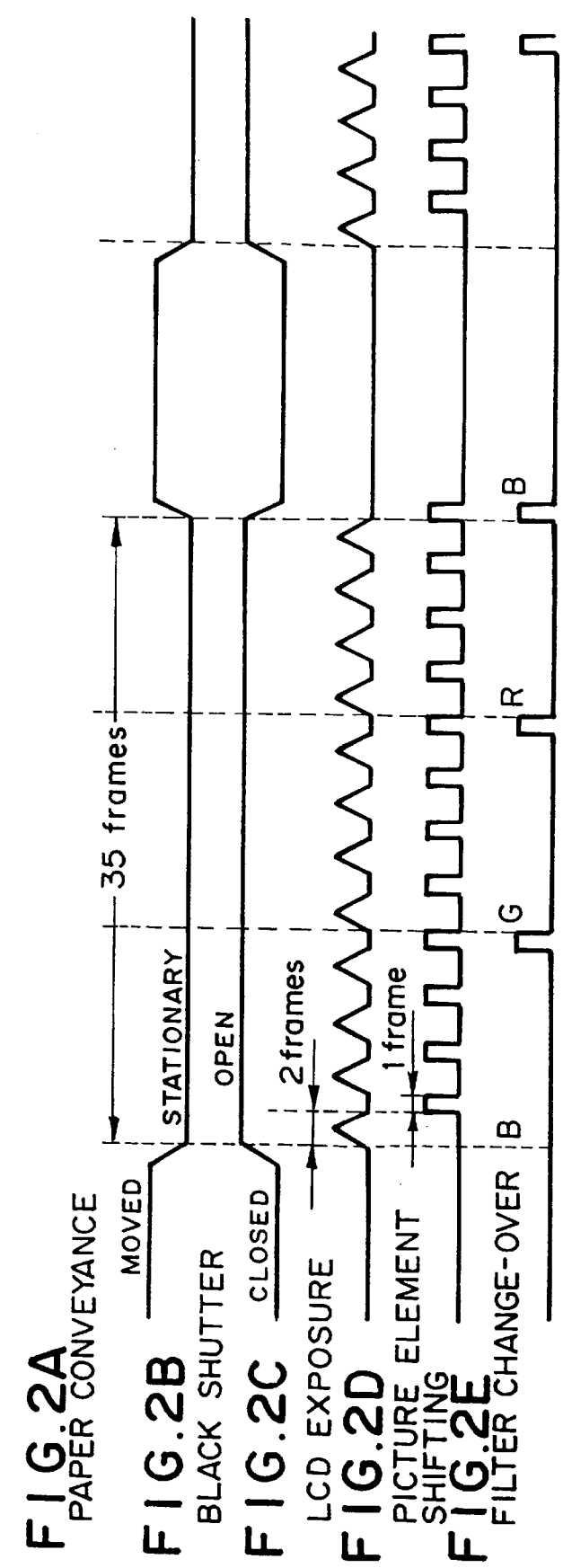

IMAGE-WISE EXPOSURE APPARATUS

BACKGROUND OF THE INVENTION

1. Field of the Invention

This invention relates to an image-wise exposure apparatus, wherein a photosensitive material is exposed image-wise by using a spatial modulation device, such as a liquid crystal panel. This invention particularly relates to an image-wise exposure apparatus, wherein a picture element shifting operation is carried out such that a high resolution image may be obtained on the photosensitive material.

2. Description of the Prior Art

An image-wise exposure apparatus has heretofore been proposed, wherein recording light is modulated by a spatial modulation device, such as a liquid crystal panel, the modulated recording light is irradiated to a photosensitive material, and the photosensitive material is thereby exposed image-wise. Such an image-wise exposure apparatus is described in, for example, Japanese Unexamined Patent Publication No. 4(1992)-7542. Basically, the spatial modulation device comprises a plurality of picture elements (in the cases of the liquid crystal panel, a plurality of liquid crystal cells), the transmittances or the reflectivities of which can be changed, and which are located in the form of a two-dimensional array.

Also, as a spatial modulation device suitable for such an image-wise exposure apparatus, a mirror array device is known. The mirror array device comprises a plurality of small mirrors, which are located in the form of a two-dimensional array, and a driving means for changing the orientations of the respective small mirrors independently. The orientation of each small mirror of the mirror array device is changed such that light incident upon the small mirror may be selectively reflected toward one of two directions.

With the mirror array device described above, in cases where the driving means of the mirror array device is controlled in accordance with an image signal, the light impinging upon a predetermined projection surface via a small mirror can be modulated for each small mirror, and the image can be projected onto the projection surface. Also, in cases where a photosensitive material is located along the projection surface, the photosensitive material can be exposed image-wise. In such cases, the amount of light impinging upon the photosensitive material can be controlled for each small mirror by, for example, carrying out pulse width modulation of the on time of each small mirror (i.e., the time during which each small mirror is set in the orientation that causes the light to impinge upon the photosensitive material) within a frame period. In this manner, a gradation image can be formed on the photosensitive material.

In these types of image-wise exposure apparatuses, the plurality of the picture elements of the spatial modulation device, which are located in the form of the two-dimensional array, are often raster-scanned in accordance with an image signal, such as a television signal according to the national television system committee (NTSC) standards or the high definition television (HDTV) standards. In such cases, the driving circuit for the spatial modulation device can be formed with a comparatively low cost by utilizing a commercially available integrated circuit for image signal processing, or the like.

It has been proposed that, in cases where a photosensitive material is exposed image-wise by utilizing a spatial modulation device, such as a liquid crystal panel, the so-called "picture element shifting" technique may be utilized in order to increase the density of picture elements of the formed image and thereby to obtain a high resolution image. As described in, for example, Japanese Unexamined Patent Publication No. 4(1992)-7542, with the picture element shifting technique, the optical relationship between the spatial modulation device and the photosensitive material is changed such that, after exposure dots have been formed on the photosensitive material by the light having passed through the picture elements of the spatial modulation device (e.g., in the cases of the liquid crystal panel, the liquid crystal cells), exposure dots may further be formed between adjacent exposure dots by the light having passed through the picture elements of the spatial modulation device. Also, the image-wise exposure is carried out each time the optical relationship is changed.

As for the image formed by the image-wise exposure, the aforesaid exposure dots constitute the picture elements of the formed image. In this specification, such that the picture elements of the formed image may be discriminated from the picture elements of the spatial modulation device, unless otherwise specified, the picture elements of the formed image are referred to as the exposure dots.

For example, the spatial modulation device may comprise i number of picture elements, which are arrayed along an X direction, and j number of picture elements, which are arrayed along a Y direction. In such cases, if the picture element shifting operation is carried out one time along the X direction and one time along the Y direction, 2i number of exposure dots will be recorded along the X direction on the photosensitive material, and 2j number of exposure dots will be recorded along the Y direction on the photosensitive material. Specifically, in such cases, it is possible to record the same number of exposure dots as that of the exposure dots, which will be recorded when the image-wise exposure is carried out one time by using a spatial modulation device comprising 4(i×j) number of picture elements. Therefore, the resolution of the image formed on the photosensitive material can be increased.

In order to change the optical relationship between the spatial modulation device and the photosensitive material in the manner described above, the spatial modulation device may be moved. Alternatively, the photosensitive material may be moved. As another alternative, an optical member located between the spatial modulation device and the photosensitive material may be moved.

Ordinarily, in the cases of the spatial modulation device, such as the liquid crystal panel, it is difficult to integrate a large number of picture elements at a high density. However, if the aforesaid picture element shifting technique is employed, a high-density image can be formed with the image-wise exposure by using a spatial modulation device, which comprises a comparatively small number of picture elements located at a comparatively low density.

When the aforesaid picture element shifting operation is carried out, if the photosensitive material is left to be exposed to the recording light, the effects of the picture element shifting operation will become small. Therefore, as described in, for example, Japanese Unexamined Patent Publication No. 4(1992)-7542, it is considered to block all of the picture elements of the spatial modulation device, such as the liquid crystal panel, from light and to carry out the picture element shifting operation in this state.

However, heretofore, sufficient consideration has not been given to the control for setting all of the picture elements of the spatial modulation device to the condition blocked from light. Therefore, in cases where the spatial modulation device is set to the condition blocked from light, a long time has heretofore been required for the image-wise exposure.

SUMMARY OF THE INVENTION

The primary object of the present invention is to provide an image-wise exposure apparatus, which has sufficient effects of a picture element shifting operation and is capable of quickly carry out image-wise exposure.

The present invention provides a first image-wise exposure apparatus, comprising:

i) a light source for producing recording light, to which a photosensitive material is to be exposed, ii) a spatial modulation device provided with:

a) a plurality of picture elements, the transmittances or the reflectivities of which are capable of being changed, and which are located in the form of a two-dimensional array at positions that receive the recording light, and b) a driving means for raster-scanning the plurality of the picture elements in accordance with an image signal (such as a television signal) and thereby changing the transmittances or the reflectivities of the respective picture elements, the spatial modulation device controlling the impingement of the incident recording light upon the photosensitive material for each of the picture elements, and iii) a picture element shifting means for changing the optical relationship between the spatial modulation device and the photosensitive material such that, after exposure dots have been formed on the photosensitive material by the recording light having passed through the plurality of the picture elements of the spatial modulation device, exposure dots may further be formed between adjacent exposure dots by the recording light having passed through the picture elements of the spatial modulation device, wherein the improvement comprises the provision of a control means, which sets all of the picture elements of the spatial modulation device to a totally closed condition for a single frame period and drives the picture element shifting means while all of the picture elements of the spatial modulation device are being in the totally closed condition.

The present invention also provides a second image-wise exposure apparatus, comprising the light source, the spatial modulation device, and the picture element shifting means, which are defined in the first image-wise exposure apparatus in accordance with the present invention, wherein the improvement comprises the provision of a control means, which sets all of the picture elements of the spatial modulation device to a totally closed condition for a single field period and drives the picture element shifting means while all of the picture elements of the spatial modulation device are being in the totally closed condition.

The present invention further provides a third image-wise exposure apparatus, comprising the light source, the spatial modulation device, and the picture element shifting means, which are defined in the first image-wise exposure apparatus in accordance with the present invention, wherein the improvement comprises the provision of a control means, which sets all of the picture elements of the spatial modulation device to a totally closed condition for a single vertical blanking period and drives the picture element shifting means while all of the picture elements of the spatial modulation device are being in the totally closed condition.

In cases where the plurality of the picture elements of the spatial modulation device are raster-scanned in accordance with the image signal, each of the frame period in the first image-wise exposure apparatus in accordance with the present invention, the field period in the second image-wise exposure apparatus in accordance with the present invention, and the vertical blanking period in the third image-wise exposure apparatus in accordance with the present invention, can be defined in accordance with a clock signal generated by a scanning control circuit, or the like. By way of example, in accordance with the NTSC standards or the HDTV standards, the frame period is equal to 1/30 second, the field period is equal to 1/60 second, and the vertical blanking period is equal to 1/750 second. Therefore, with the first, second, and third image-wise exposure apparatuses in accordance with the present invention, the time, during which all of the picture elements of the spatial modulation device are set in the condition blocked from light, can be kept sufficiently short, and the image-wise exposure can be carried out quickly.

BRIEF DESCRIPTION OF THE DRAWINGS

FIGS. 2A, 2B, 2C, 2D, and 2E are timing charts showing the timings, with which the respective operations in the embodiment of FIG. 1 are carried out.

DESCRIPTION OF THE PREFERRED EMBODIMENTS

The present invention will hereinbelow be described in further detail with reference to the accompanying drawings.

Figure 1:
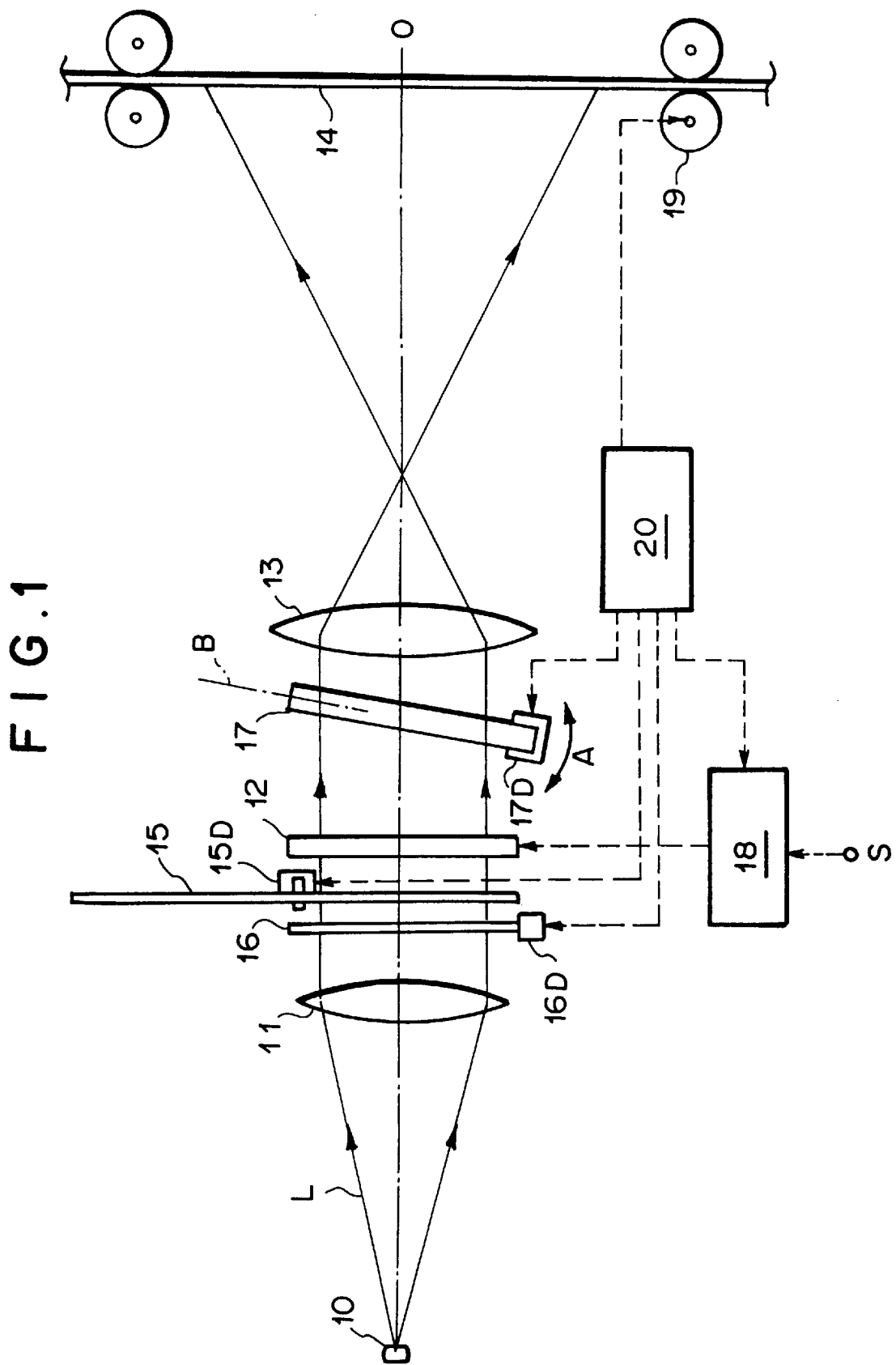
FIG. 1 is a side view showing an embodiment of the image-wise exposure apparatus in accordance with the present invention.

FIG. 1 shows an embodiment of the image-wise exposure apparatus in accordance with the present invention. As illustrated in FIG. 1, the image-wise exposure apparatus comprises a light source 10 for producing recording light L, to which a color photosensitive material 14 is to be exposed, and a converging lens 11, which is located such that the light source 10 may be located in the vicinity of the focal point of the converging lens 11 and which collimates the recording light L having been produced by the light source 10. The image-wise exposure apparatus also comprises a liquid crystal display panel 12, which comprises a plurality of TN liquid crystal cells, or the like, located in the form of a two-dimensional array and which is located in an orientation such that it may be approximately normal to the optical axis O of the converging lens 11. The image-wise exposure apparatus further comprises an image forming lens 13 located at the position upon which the recording light L having passed through the liquid crystal display panel 12 impinges. The image-wise exposure apparatus still further comprises a color filter 15 and a black shutter 16, which are inserted into the optical path of the recording light L at positions upstream from the liquid crystal display panel 12. Also, a plane-parallel plate 17 for carrying out a picture element shifting operation is located between the liquid crystal display panel 12 and the image forming lens 13.

By way of example, the light source 10 is constituted of a halogen lamp for producing white light and is located such that the center point of the filament of the halogen lamp may be located on the optical axis O of the converging lens 11. The black shutter 16 is driven by a driving means 16D and selectively takes the condition inserted into the optical path of the recording light L or the condition retracted from it. The plane-parallel plate 17 is swung in directions, which are indicated by the double headed arrow A in FIG. 1, and in a direction of rotation around an axis B.

The liquid crystal display panel 12 is driven by a driving circuit 18, which receives an image signal S representing a gradation image. The liquid crystal display panel 12 carries out spatial modulation of the recording light L and displays the gradation image. Specifically, a voltage in accordance with the image signal S is applied from the driving circuit 18 to each of the plurality of the liquid crystal cells of the liquid crystal display panel 12, which are located in the form of the two-dimensional array. The transmittance of each liquid crystal cell with respect to the recording light L is changed in accordance with the value of the applied voltage, and the gradation image is thereby displayed on the liquid crystal display panel 12. In this embodiment, the liquid crystal cells are raster-scanned in accordance with a television signal according to the HDTV standards.

The image forming lens 13 forms the gradation image, which has thus been displayed on the liquid crystal display panel 12, on the color photosensitive material 14. The color photosensitive material 14 is thereby exposed image-wise. In this embodiment, the color photosensitive material 14 is constituted of long color photographic paper (color paper) and is moved intermittently by a distance equal to the length of a single frame on the color photosensitive material 14. The color photosensitive material 14 is moved by the conveyance means 19.

The color filter 15 is provided with a B (blue) filter, a G (green) filter, and an R (red) filter. The B (blue), G (green), and R (red) filters are sequentially inserted into the optical path of the recording light L by a driving means 15D. While one of the B (blue), G (green), and R (red) filters is being inserted into the optical path of the recording light L, the liquid crystal display panel 12 is driven in accordance with the color image signal corresponding to the color of the inserted filter. At the time at which the filter inserted into the optical path of the recording light L is changed over among the B (blue), G (green), and R (red) filters, all of the picture elements of the liquid crystal display panel 12 are set to the condition blocked from the recording light L.

In the manner described above, the color photosensitive material 14 is sequentially exposed to the blue light, the green light, and the red light, which have been modulated. A color photographic latent image is thereby recorded on the color photosensitive material 14.

The operations of the driving means 15D, the driving means 16D, the driving means 17D, the driving circuit 18, and the conveyance means 19 are controlled by a control circuit 20 such that the operations may be synchronized with one another. FIGS. 2A through 2E show the timings, with which the processes in accordance with these operations, i.e. change-over of the color filter and the picture element shifting operation, which will be described later, and the like, are carried out.

Figure 3A:
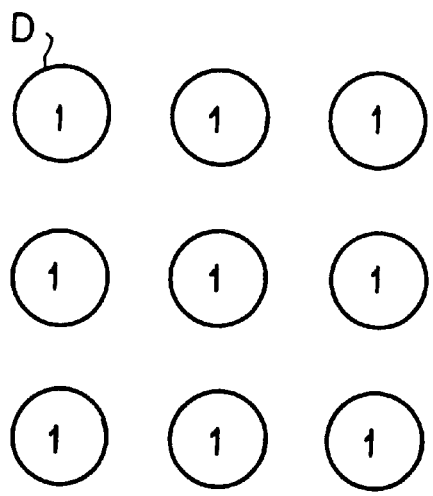
FIGS. 3A, 3B, 3C, and 3D are explanatory views showing how a picture element shifting operation is carried out in the embodiment of FIG. 1.

How the picture element shifting operation is carried out will be described hereinbelow. While one of the B (blue), G (green), and R (red) filters is being inserted into the optical path of the recording light L, the plane-parallel plate 17 is set to four different orientations. Each time the plane-parallel plate 17 is set to one of the four different orientations, image-wise exposure is carried out in accordance with the color image signal corresponding to the color of the filter, which is being inserted into the optical path of the recording light L. Specifically, for example, while the B (blue) filter is being inserted into the optical path of the recording light L, the plane-parallel plate 17 is kept at a first position, and the liquid crystal display panel 12 is driven in this condition. At this time, the liquid crystal display panel 12 is driven in accordance with the blue image signal, which represents the picture elements at odd-numbered rows and odd-numbered columns in the array of picture elements of the image to be formed. As a result, as illustrated in FIG. 3A, exposure dots D indicated by "1" are recorded on the color photosensitive material 14. In FIGS. 3A, 3B, 3C, and 3D, the shape of the exposure dots D is schematically shown as a circular shape.

Figure 3B:
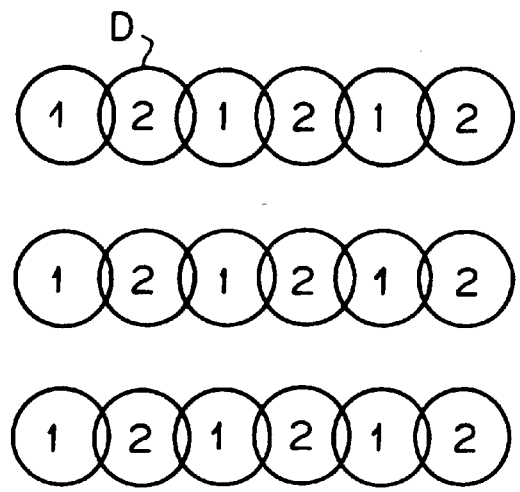

Thereafter, the plane-parallel plate 17 is swung by a predetermined angle toward one of the directions indicated by the double headed arrow A in FIG. 1 and is thereby located at a second position. In this condition, the liquid crystal display panel 12 is driven. At this time, the liquid crystal display panel 12 is driven in accordance with the blue image signal, which represents the picture elements at odd-numbered rows and even-numbered columns in the array of picture elements of the image to be formed. As a result, as illustrated in FIG. 3B, exposure dots D indicated by "2" are recorded on the color photosensitive material 14.

Figure 3C:
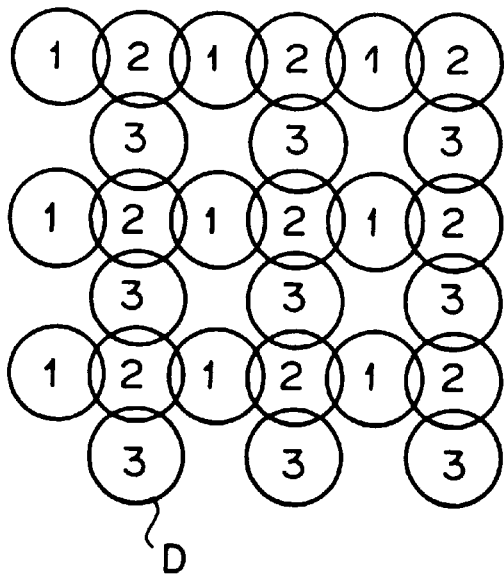

Thereafter, the plane-parallel plate 17 is swung by a predetermined angle around the axis B shown in FIG. 1 and is thereby located at a third position. In this condition, the liquid crystal display panel 12 is driven. At this time, the liquid crystal display panel 12 is driven in accordance with the blue image signal, which represents the picture elements at even-numbered rows and even-numbered columns in the array of picture elements of the image to be formed. As a result, as illustrated in FIG. 3C, exposure dots D indicated by "3" are recorded on the color photosensitive material 14.

Figure 3D:
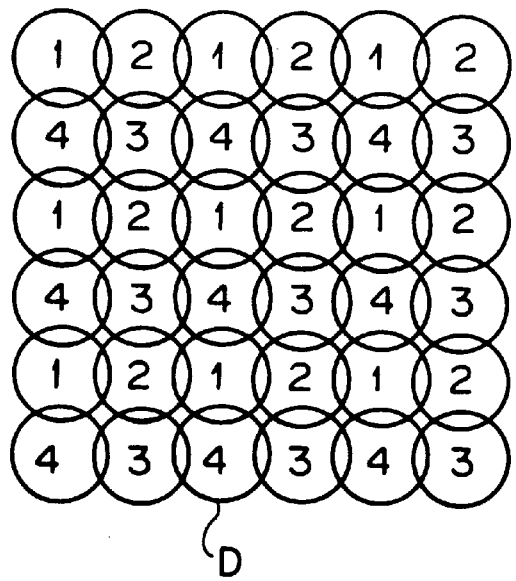

Thereafter, the plane-parallel plate 17 is swung by a predetermined angle toward the reverse direction indicated by the double headed arrow A in FIG. 1 (i.e., toward the direction reverse to the direction, toward which the plane-parallel plate 17 was swung from the first position to the second position) and is thereby located at a fourth position. In this condition, the liquid crystal display panel 12 is driven. At this time, the liquid crystal display panel 12 is driven in accordance with the blue image signal, which represents the picture elements at even-numbered rows and odd-numbered columns in the array of picture elements of the image to be formed. As a result, as illustrated in FIG. 3D, exposure dots D indicated by "4" are recorded on the color photosensitive material 14. Thereafter, in lieu of the B (blue) filter, the G (green) filter is inserted into the optical path of the recording light L. While the insertion of the G (green) filter into the optical path is being carried out, the plane-parallel plate 17 is returned to the first position.

In the manner described above, the picture element shifting is carried out one time with respect to each of the perpendicularly intersecting picture element array directions X and Y of the liquid crystal display panel 12. Therefore, with respect to both of the X and Y directions, the number of the exposure dots D, which is two times as large as the number of the picture elements arrayed on the liquid crystal display panel 12, are recorded on the color photosensitive material 14. Accordingly, a high resolution image can be formed on the color photosensitive material 14.

The picture element shifting operation described above is carried out in the same manner as that described above also when each of the G (green) filter and the R (red) filter is inserted into the optical path of the recording light L and the image-wise exposure operation is thereby carried out. Thereafter, the color photosensitive material 14 is subjected to an ordinary developing process, and the latent image having been formed thereon is thereby developed into a visible image.

The timings, with which the picture element shifting operation, the change-over of the color filter, and the like, are carried out will be described hereinbelow with reference to FIGS. 2A through 2E. As illustrated in FIG. 2A, the color photosensitive material (color paper) 14 is kept stationary while the exposure operation for a single image is being carried out. When the exposure operation for a single image has been completed, the color photosensitive material 14 is moved a distance, which equal to the length of a single frame on the color photosensitive material 14, and over a predetermined time. As illustrated in FIG. 2B, while the color photosensitive material 14 is thus being moved, the black shutter 16 is kept in the closed condition, i.e. in the condition inserted into the optical path of the recording light L, and unnecessary light is thereby prevented from impinging upon the color photosensitive material 14.

As illustrated in FIG. 2C, a single image-wise exposure step with the liquid crystal display panel 12 is carried out over a time span of two frame periods. Of the two frame periods, one frame period (in accordance with the HDTV standards, $1/30$ second) is utilized in order to return the liquid crystal display panel 12 to the condition, in which all of the picture elements of the liquid crystal display panel 12 are totally closed. Therefore, the actual exposure time in the single image-wise exposure step is equal to the single frame period=$1/30$ second. After the liquid crystal display panel 12 is set to the condition, in which all of the picture elements of the liquid crystal display panel 12 are totally closed, this condition is kept for the single frame period. As illustrated in FIG. 2D, while this condition is being kept for the single frame period, a drive signal is fed from the control circuit 20 into the driving means 17D, and a picture element shifting step is carried out by the plane-parallel plate 17.

As described above, the driving circuit 18 carries out the raster scanning of the liquid crystal cells, which serve as the picture elements of the liquid crystal display panel 12, in accordance with the television signal according to the HDTV standards. Therefore, the aforesaid frame period can be defined in accordance with a clock signal, which is generated by the driving circuit 18.

As illustrated in FIG. 2E, the change-over of the color filter is carried out simultaneously with the fourth picture element shifting step in the image-wise exposure operation for each color light. The conveyance of the color photosensitive material 14 is begun at the same time as when the last picture element shifting step and the last color filter change-over step in the image-wise exposure operation for a single image are begun.

As described above, in this embodiment, the liquid crystal display panel 12 is set to the condition, in which all of the picture elements of the liquid crystal display panel 12 are totally closed, only for as short a time span as the single frame period. In this condition, the picture element shifting step is carried out. Therefore, the image-wise exposure operation can be carried out quickly. Specifically, in the exposure operation for a single image, the time required to carry out the exposure steps is equal to $(1+1)\times 4T\times 3$, wherein T represents the single frame period, and the time required to carry out the picture element shifting steps is equal to $4T\times 3-T$. Therefore, the total time required to carry out the exposure operation for a single image is equal to $24T+11T=35T$, i.e. approximately 1.2 seconds.

In this embodiment, the actual image-wise exposure in each image-wise exposure step between two adjacent picture element shifting steps is carried out only for a single frame period. Therefore, as described above, in the exposure operation for a single image, the time required to carry out the exposure steps is equal to $(1+1)\times 4T\times 3$. In general, if the actual image-wise exposure in each image-wise exposure step between two adjacent picture element shifting steps is carried out for a time span of n frame periods, the time required to carry out the exposure steps in the exposure operation for a single image will become equal to $(n+1)\times 4T\times 3$. In such cases, the total time required to carry out the exposure operation for a single image will be equal to $(23+12n)T$.

Also, in the embodiment described above, the liquid crystal display panel 12 is set to the condition, in which all of the picture elements of the liquid crystal display panel 12 are totally closed, for the single frame period. While the liquid crystal display panel 12 is being set to this condition, the picture element shifting step is carried out. Alternatively, the liquid crystal display panel 12 may be set to the condition, in which all of the picture elements of the liquid crystal display panel 12 are totally closed, for a single field period (in accordance with the HDTV standards, $1/60$ second). Also, while the liquid crystal display panel 12 is being set to this condition, the picture element shifting step may be carried out. In such cases, the time required to carry out the exposure steps in the exposure operation for a single image is the same as the time in the aforesaid embodiment, and the time required to carry out the picture element shifting steps in the exposure operation for a single image is equal to $(4T\times 3-T)\times 30/60$. Therefore, the total time required to carry out the exposure operation for a single image is equal to $29.5T$. Specifically, in such cases, the total time required to carry out the exposure operation for a single image becomes shorter by $(35-29.5)T$, i.e. approximately 0.18 second, than in the aforesaid embodiment.

As another alternative, the liquid crystal display panel 12 may be set to the condition, in which all of the picture elements of the liquid crystal display panel 12 are totally closed, for a single vertical blanking period (in accordance with the HDTV standards, $1/750$ second). Also, while the liquid crystal display panel 12 is being set to this condition, the picture element shifting step may be carried out. In such cases, the time required to carry out the exposure steps in the exposure operation for a single image is the same as the time in the aforesaid embodiment, and the time required to carry out the picture element shifting steps in the exposure operation for a single image is equal to $(4T\times 3-T)\times 30/750$. Therefore, the total time required to carry out the exposure operation for a single image is equal to $24.44T$. Specifically, in such cases, the total time required to carry out the exposure operation for a single image becomes shorter by $(35-24.44)T$, i.e. approximately 0.35 second, than in the aforesaid embodiment.

Further, in the embodiment described above, the color image exposure is carried out by changing over the color filter. The image-wise exposure apparatus in accordance with the present invention is also applicable when three-color recording light beams are respectively subjected to spatial modulation with three independent spatial modulation devices, the modulated recording light beams are irradiated simultaneously to the photosensitive material, and the photosensitive material is thereby exposed image-wise.

What is claimed is:

1. An image exposure apparatus, comprising:
   i) a light source for producing recording light, to which a photosensitive material is to be exposed;
   ii) a spatial modulation device comprising:
      a) a plurality of picture elements having adjustable transmittances or reflectivities, and which are disposed in a two-dimensional array at positions that receive the recording light, and
      b) driving means for raster-scanning the plurality of the picture elements in accordance with an image signal and thereby changing the transmittances or the reflectivities of the respective picture elements, wherein
   the spatial modulation device controls impingement of the incident recording light upon the photosensitive material for each of the picture elements;
   iii) a picture element shifting means for changing an optical relationship between the spatial modulation device and the photosensitive material such that, after exposure dots have been formed on the photosensitive material by the recording light having passed through the plurality of the picture elements of the spatial modulation device, exposure dots may further be formed between adjacent exposure dots by the recording light having passed through the picture elements of the spatial modulation device; and
   iv) control means for, after an image-wise exposure step is carried out for a predetermined number of frame periods, setting the picture elements of the spatial modulation device to a totally closed condition for a single frame period and driving the picture element shifting means to change the optical relationship between the spatial modulation device and the photosensitive material while the picture elements of the spatial modulation device are in the totally closed condition.

2. An image exposure apparatus as defined in claim 1, wherein the spatial modulation device is a liquid crystal display panel.

3. An image exposure apparatus as defined in claim 1, wherein the image signal is a television signal, and the single frame period is equal to $1/30$ second in accordance with high definition television standards.

4. An image exposure apparatus, comprising:
   i) a light source for producing recording light, to which a photosensitive material is to be exposed;
   ii) a spatial modulation device comprising:
      a) a plurality of picture elements having adjustable transmittances or reflectivities, and which are disposed in a two-dimensional array at positions that receive the recording light, and
      b) a driving means for raster-scanning the plurality of the picture elements in accordance with an image signal and thereby changing the transmittances or the reflectivities of the respective picture elements, wherein
   the spatial modulation device controls impingement of the incident recording light upon the photosensitive material for each of the picture elements;
   iii) a picture element shifting means for changing an optical relationship between the spatial modulation device and the photosensitive material such that, after exposure dots have been formed on the photosensitive material by the recording light having passed through the plurality of the picture elements of the spatial modulation device, exposure dots may further be formed between adjacent exposure dots by the recording light having passed through the picture elements of the spatial modulation device; and
   iv) control means for, after an image-wise exposure step is carried out for a predetermined number of frame periods, setting the picture elements of the spatial modulation device to a totally closed condition for a single field period and driving the picture element shifting means to change the optical relationship between the spatial modulation device and the photosensitive material while the picture elements of the spatial modulation device are in the totally closed condition.

5. An image exposure apparatus as defined in claim 4, wherein the spatial modulation device is a liquid crystal display panel.

6. An image exposure apparatus as defined in claim 4, wherein the image signal is a television signal, and the single field period is equal to $1/60$ second in accordance with high definition television standards.

7. An image exposure apparatus, comprising:
   i) a light source for producing recording light, to which a photosensitive material is to be exposed;
   ii) a spatial modulation device comprising:
      a) a plurality of picture elements having adjustable transmittances or reflectivities, and which are disposed in a two-dimensional array at positions that receive the recording light, and
      b) driving means for raster-scanning the plurality of the picture elements in accordance with an image signal and thereby changing the transmittances or the reflectivities of the respective picture elements, wherein
   the spatial modulation device controls impingement of the incident recording light upon the photosensitive material for each of the picture elements;
   iii) a picture element shifting means for changing an optical relationship between the spatial modulation device and the photosensitive material such that, after exposure dots have been formed on the photosensitive material by the recording light having passed through the plurality of the picture elements of the spatial modulation device, exposure dots may further be formed between adjacent exposure dots by the recording light having passed through the picture elements of the spatial modulation device; and
   iv) control means for, after an image-wise exposure step is carried out for a predetermined number of frame periods, setting the picture elements of the spatial modulation device to a totally closed condition for a single vertical blanking period and driving the picture element shifting means to change the optical relationship between the spatial modulation device and the photosensitive material while the picture elements of the spatial modulation device are in the totally closed condition.

8. An image exposure apparatus as defined in claim 7, wherein the spatial modulation device is a liquid crystal display panel.

9. An image exposure apparatus as defined in claim 7, wherein the image signal is a television signal, and the single vertical blanking period is equal to $1/750$ second in accordance with high definition television standards.

* * * * *